United States Patent Office 3,025,311
Patented Mar. 13, 1962

3,025,311
HYDROCORTISONE 21-ββ-DIMETHYL GLUTARATE AND DERIVATIVES THEREOF
Erwin S. Gutsell, Jr., and Barney J. Magerlein, Kalamazoo Township, Kalamazoo County, Mich., assignors to The Upjohn Company, Kalamazoo, Mich., a corporation of Michigan
No Drawing. Filed July 1, 1955, Ser. No. 519,612
3 Claims. (Cl. 260—397.45)

This invention relates to a novel composition of matter and is particularly directed to physiologically active, water-soluble derivatives of physiologically active corticoid hormones having the formula:

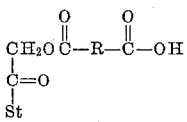

wherein St is the 17-cyclopentanopolyhydrophenthreno moiety of a physiologically active corticoid hormone and R is a lower α,β- or α, γ-alkylene radical having a methyl group two atoms removed from each carboxyl group and the salts thereof. The term "lower" is intended to indicate not more than eight carbon atoms. St for the most part is a 17-(3-keto-Δ⁴-androstenyl) radical which can have a β-hydroxy or oxo group in the 11-position, an α-hydroxy group in the 17-position, a methyl group in the 2-position, an α-halogen in the 9-position, and a Δ¹-double bond.

Hydrocortisone and like physiologically active corticoid hormones, alone or in combination with other drugs, are widely used for the control of inflammatory conditions, adrenocortical insufficiency, and like malfunctions of the body. No entirely satisfactory preparation, however, has been available heretofore for the treatment of emergency conditions, such as lupus erythrematosus in relapse, Addisonian crisis, the Waterhouse-Friderichsen syndrome, emergency surgery, acute hypersensitive reactions, bilateral adrenalectomy and other forms of acute adrenocortical insufficiencies. Nor have entirely satisfactory water-soluble derivatives and/or preparations been available for any purpose.

The need for a preparation from which hydrocortisone and like physiologically active corticoid hormones could be released into the blood stream rapidly enough to provide the immediate response necessary in emergency conditions has been long recognized and this need has recently been partially fulfilled by a preparation containing hydrocortisone dissolved in ethyl alcohol. However, because of the concentration of ethyl alcohol this preparation had to be diluted with plasma, plasma extender, saline solution, or the like before it could be safely introduced into the blood stream and even then had to be administered as an intravenous drip. The treatment required professional equipment and continued professional supervision such as could only be obtained in a hospital and therefore was not suitable for extemporaneous or emergency application outside of a hospital. The hydrocortisone preparations heretofore available, therefore, have not been adequate fully to meet the need for immediate hydrocortisone response in emergencies arising outside of a hospital.

It is an object of the invention to provide new and useful compositions of matter. It is a further object of the invention to prepare physiologically active derivatives of physiologically active corticoid hormones which can be administered parenterally, orally, or topically without difficulty and from which the corticoid hormonal activity is rapidly made available for its intended function. It is a further object of the invention to avoid the disadvantages of the prior art and to obtain advantages as will be more particularly pointed out. Still other objects will become apparent as the description proceeds.

The compounds of the invention are prepared by reacting a physiologically active corticoid hormone with a dicarboxylic inner anhydride according to the following equation:

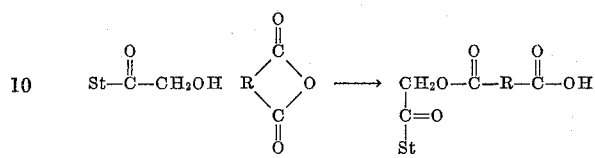

in which St and R are as defined above. Compounds thus characterized are substantially more resistant to hydrolysis than the corresponding compounds without a methyl group two carbon atoms removed from the esterified carboxyl group. For example, aqueous solutions of hydrocortisone 21-hemi-β,β-dimethylglutarate and hydrocortisone 21-hemi-β-methylglutarate remain clear on standing at room temperature substantially longer than aqueous solutions of hydrocortisone 21-hemisuccinate and hydrocortisone 21-hemiglutarate.

Advantageously the acid esters are converted to their water-soluble salts, such as alkali and alkaline earth metal salts and ammonium salts (substituted and unsubstituted). Sterile aqueous solutions of these salts also are suitable for intravenous administration in accordance with this invention and have the advantage that more concentrated solutions can be formed.

Advantageously the aqueous solutions thus prepared are buffered with a neutral buffer, such as a phosphate buffer adjusted to neutrality. On hydrolysis of the esters of the invention, the liberated acid salt, unless neutralized by a neutral buffer, reacts with the ester salt, thereby freeing the relatively insoluble ester-acid. Hydrolysis, therefore, causes cloudiness due to precipitation of insoluble materials entirely out of proportion to the amount of ester hydrolyzed. Thus aqueous solutions according to the invention desirably are stabilized by means of a neutral buffer.

To further improve the stability, the compounds of the invention are most suitably packaged as dry compositions. Advantageously an aqueous solution is sterilized by filtration and then lyophilized to give a dry, stable precipitate. The sterile solutions advantageously are lyophilized in sterile vials to which sterile aqueous vehicle can be added at the time of use for preparing sterile aqueous solutions suitable for intravenous injection. Suitably these vials can have a rubber cap which can be punctured by a hypodermic needle to introduce the sterile aqueous vehicle. Suitably also the sterile vehicle and the dry precipitate can be packaged in the separate compartments of a dual cartridge suitable for use in hypodermic syringes designed for first mixing a solid with a solvent and for thereafter injecting the solution thus formed into the patient.

Compositions most suitably adapted for use in preparing solutions for intravenous injection are obtained by coprecipitating the ester-salts of the invention with a neutral buffer salt. Thus to an aqueous solution of the estersalt there is added a phosphate buffer adjusted to neutrality, that is, to a pH of 6.5 to 8.0. The solution is then filter-sterilized and lyophilized in a suitable vial, as described above, to give a dry powder of coprecipitated ester, according to the invention, and neutral buffer salt.

In carrying out the process according to the invention, the free alcohol is reacted with an excess of the carboxylic inner anhydride in a mutual solvent, advantageously, an organic base such as pyridine or lutidine. The reaction normally takes place within a few hours at room temperature. Gentle heating can be used but is generally undesirable. Also if the anhydride is sufficiently active or if a longer time is used, temperatures below room temperature can be used.

The product ester can be recovered from the reaction mixture by the usual procedures. Advantageously the product is precipitated by adding a liquid which is capable of precipitating the product as the free acid ester or a salt thereof. An aqueous solution of hydrochloric acid or like strong mineral acid can be used advantageously when pyridine or like organic base is used as the mutual solvent. Ordinarily it will be sufficient to pour the reaction mixture slowly into an excess of dilute aqueous hydrochloric acid and then filter off the precipitated product. The product can then be further purified by crystallization from a solvent such as acetone. Suitable other solvents include: ethyl acetate, methyl ethyl ketone, isopropylalcohol and mixtures of the above solvents and Skellysolve B.

The free acid ester thus produced can be converted to a salt by neutralization with the appropriate base. Advantageously the free acid ester can be dissolved in a volatile water-miscible solvent, such as acetone, and the solution neutralized by adding aqueous alkali or alcoholic alkali. Advantageously the pH is adjusted to about 7.2 to about 7.4. Other volatile water-miscible solvents include: dioxane, isopropylalcohol, ethanol, and tetrahydrofuran. The solvent is then removed by vacuum distillation, first the volatile solvent and then the water. Advantageously, the water is removed by lyophilizations. Before lyophilization the water solution can be filter-sterilized if a sterile product is desired. Suitable alkali are the alkali and alkaline earth metal hydroxides and carbonates, such as sodium, potassium, ammonium, calcium, and magnesium hydroxides and carbonates and lower molecular weight ammonium bases such as more particularly enumerated below.

According to a preferred procedure, a buffer salt is incorporated in the aqueous solution of the ester-salt obtained by removal of the volatile solvent so that the ester-salt and the buffer are coprecipitated during the lyophilization or otherwise removal of the water. As buffer, suitable quantities of mono- and disodium orthophosphates can be dissolved in the aqueous solution of ester-salt and the pH adjusted to the desired value. If salts other than the sodium ester salt is desired, the corresponding bases or phosphate salts are used. Other acids having a weakly acidic function having a pKa close to the desired pH of 6.5 to 8.0 can be used in place of the phosphoric acid in accordance with the well recognized principles of buffering.

In preparing compounds according to the invention, the following dicarboxylic inner anhydrides can be used: $\alpha,\beta$-dimethylsuccinic anhydride, mono-, di-, chloro-, and bromo-$\alpha,\beta$-diethylsuccinic anhydride, $\alpha,\beta$-dichloro-$\alpha,\beta$-dimethylsuccinic anhydride, $\beta$-methylglutaric anhydride, $\alpha,\beta$-dimethylglutaric anhydride, $\alpha,\alpha$-diethylglutaric anhydride, $\beta,\beta$-dimethylglutaric anhydride, $\alpha$-ethyl-$\beta$-methylglutaric anhydride, $\beta$-ethyl-$\beta$-methylglutaric anhydride, $\alpha,\alpha,\beta$-trimethylglutaric anhydride, $\alpha,\beta,\beta$-trimethylglutaric anhydride, $\alpha,\beta,\gamma$-trimethylglutaric anhydride, $\alpha$-ethyl-$\beta,\beta$-dimethylglutaric anhydride, $\alpha,\alpha,\beta,\beta$-tetramethylglutaric anhydride, $\alpha,\beta,\beta,\gamma$-tetramethylglutaric anhydride, $\beta$-methyl-$\beta$-butylglutaric anhydride, $\beta$-methyl-$\beta$-isobutylglutaric anhydride, and the like.

Advantageously anhydrides such as the $\beta$-methyl and $\beta,\beta$-dimethylglutaric anhydrides are used because the $\beta$-methyl groups are two atoms removed from both carboxyl groups.

The compounds of the invention form salts with the alkali metal and alkaline earth metal bases such as sodium, potassium, lithium, ammonium, calcium, strontium, and magnesium hydroxides and carbonates, and basic amines such as mono-, di-, and trimethylamines, mono-, di-, and triethylamines, mono-, di-, and triisopropylamines, ethyldimethylamine, benzyldiethylamine, cyclohexylamine, dibenzylamine, and like N,N'-dibenzylethylene diamine, bis-orthomethoxy-N-methyl ortho-phenylisopropylamine, methoxyphenylisopropylamine, loweraliphatic, lower-cycloaliphatic, and lower-araliphatic amines up to and including about eight carbon atoms; heterocyclic amines such as piperidine, morpholine, pyrrolidine, piperazine, and the lower-alkyl derivatives thereof, such as, 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, and the like. Amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl - 1 - propanol, tris(hydroxymethyl)aminomethane, phenylmonoethanolamine, p-tertiaryarmylphenyldiethanolamine, galactamine, N-methyl glucamine, N-methyl glucosamine, ephedrine, phenylephrine, epinephrine, procaine, and the like.

The following examples are illustrative of the process and products of the invention but are not to be construed as limiting.

EXAMPLE 1

*Hydrocortisone 21-Hemi-$\beta,\beta$-Dimethylglutarate*

To a solution of 26 grams of $\beta,\beta$-dimethylglutaric anhydride in 200 milliliters of pyridine was added twenty grams of hydrocortisone with stirring. When the hydrocortisone was completely dissolved, stirring was discontinued, and the flask was flushed with nitrogen. The reaction was allowed to stand twenty hours and was then slowly poured into a stirred cold solution of 240 milliliters of concentrated hydrochloric acid in 1800 milliliters of water.

The mixture was extracted with ethyl acetate and the ethyl acetate layer washed with dilute hydrochloric acid and water, dried over anhydrous magnesium sulfate, and concentrated to 150 milliliters under reduced pressure. Skellysolve B was added to the solution and crystallization allowed to take place at zero degrees centigrade. After 24 hours the product was collected by filtration. Yield: 16.7 grams (60 percent), melting point 183.5–186 degrees centigrade.

EXAMPLE 2

*Sodium Hydrocortisone 21-Hemi-$\beta,\beta$-Dimethylglutarate*

To a solution of 170 grams of hydrocortisone 21-hemi-$\beta,\beta$-dimethylglutarate in 840 milliliters of acetone was added 600 milliliters of 0.5 normal aqueous sodium hydroxide solution. Successive ten-milliliter portions of base were added until a small sample of the steroid solution diluted with water had a pH of 7.3.

The solution was diluted with 1000 milliliters of water, extracted three times with ethyl acetate, and concentrated at reduced pressure to remove dissolved ethyl acetate. The solution was clarified by filtration through diatomaceous earth and lyophilized to yield 175 grams of light tan powder.

$\epsilon_{243}^{max}$ 14,300 (ethyl alcohol)

EXAMPLE 3

*Hydrocortisone 21-Hemi-$\beta$-Methylglutarate*

To a solution of fifteen grams of $\beta$-methylglutaric anhydride in 150 milliliters of pyridine was added fifteen grams of hydrocortisone. The flask was flushed with nitrogen, stoppered, and swirled to dissolve the hydrocortisone. The reaction was allowed to stand 24 hours, and was then slowly poured into a cold solution of 180 milliliters of concentrated hydrochloric acid in 1350 milliliters of water.

The slurry was extracted with ethyl acetate, and the extract was washed with water and dried over anhydrous magnesium sulfate. After removing the drying agent by filtration, the solution was concentrated to a syrup and allowed to crystallize at zero degrees centigrade.

The crude crystals were separated by filtration and recrystallized from acetone-Skellysolve B. Yield: 8.25 grams, melting point 187–200 degrees centigrade.

EXAMPLE 4

*Sodium Hydrocortisone 21-Hemi-β-Methylglutarate*

To a solution of 25.6 grams of hydrocortisone 21-hemi-β-methylglutarate in 200 milliliters of acetone and 200 milliliters of water there was added N/2 sodium hydroxide until the pH reached 7.2. About 86 milliliters of approximately N/2 sodium hydroxide was required. The acetone was evaporated under vacuum and the residue clarified by filtration. The pH was adjusted again to 7.0 and the solution lyophilized. The sodium salt weighed 26.7 grams. It is very water soluble.

$$\epsilon_{Max}^{EtOH}\ 243 = 14{,}875$$

By replacing the hydrocortisone in Examples 1 thru 4 by cortisone, $\Delta^1$-cortisone, $\Delta^1$-hydrocortisone, 9α-fluoro- and 9α-chlorohydrocortisone and 9α-fluoro- and 9α-chlorocortisone, 9α-fluoro- and 9α-chloro-$\Delta^1$-hydrocortisone and 9α-fluoro- and 9α-chloro-$\Delta^1$-cortisone (U.S. Serial No. 510,519), 2-methylhydrocortisone (U.S. Serial No. 485,318), and 9α-chloro- and 9α-fluoro-2-methylhydrocortisone (U.S. Serial No. 510,518), there are obtained the corresponding 21-hemi-β,β-dimethylglutarates and 21-hemi-β-methylglutarate and the sodium salts thereof.

EXAMPLE 5

*N-Methylglucamine Salt of Hydrocortisone 21-Hemi-β,β-Dimethylglutarate*

A solution is prepared by dissolving 9.8 grams of hydrocortisone 21-hemi-β,β-dimethylglutarate and 3.82 grams of N-methylglucamine in 25 milliliters of water. An additional 200 milligrams of hydrocortisone 21-hemi-β,β-dimethylglutarate is then added and the suspension stirred for ten minutes and filtered. The solution is then lyophilized. Following this procedure, the N-methylglucamine salt of hydrocortisone 21-hemi-β,β-dimethylglutarate is obtained.

EXAMPLE 6

*Galactamine Salt of Hydrocortisone 21-Hemi-β,β-Dimethylglutarate*

A solution is prepared by dissolving 108 milligrams of hydrocortisone 21-hemi-β,β-dimethylglutarate and 39 milligrams of galactamine in ten milliliters of boiling methanol. The methanol is evaporated, the residue taken up in five milliliters of water, and the water solution lyophilized. By this procedure, the galactamine salt of hydrocortisone 21-hemi-β,β-dimethylglutarate is obtained as a water-soluble, white amorphous solid.

EXAMPLE 7

*Procaine Salt of Hydrocortisone 21-Hemi-β,β-Dimethylglutarate*

A solution of 3.25 grams of procaine hydrochloride in 25 milliliters of water and ten milliliters of ten percent aqueous sodium hydroxide was extracted twice with thirty-milliliter portions of methylene chloride. To the sixty milliliters of extract was added ten milliliters of methanol and 5.4 grams of hydrocortisone 21-hemi-β,β-dimethylglutarate and the resulting solution evaporated to dryness under vacuum. By this procedure the procaine salt of hydrocortisone 21-hemi-β,β-dimethylglutarate is obtained as a water-soluble, white amorphous solid.

EXAMPLE 8

*N,N'-Dibenzylethylenediamine Salt of Hydrocortisone 21-Hemi-β,β-Dimethylglutarate*

A solution of 9.5 grams of hydrocortisone 21-hemi-β,β-dimethylglutarate and 2.56 grams of N,N'-dibenzylethylenediamine in 100 milliliters of methylene chloride was heated under reflux for ten minutes and then concentrated to a thick syrup and dried under vacuum. By this procedure the N,N'-dibenzylalkylenediamine salt of hydrocortisone 21-hemi-β,β-dimethylglutarate is obtained as a water-soluble, white amorphous solid.

EXAMPLE 9

*The Bis-Ortho-Methoxyphenylisopropylamine Salt of Hydrocortisone 21-Hemi-β,β-Dimethylglutarate*

By the procedure of Example 8 using 9.5 grams of hydrocortisone 21-hemi-β,β-dimethylglutarate, 5.8 grams of bis-ortho-methoxyphenylisopropylamine, and ninety milliliters of methylene chloride, bis-ortho-methoxyphenylisopropylamine salt of hydrocortisone 21-hemi-β,β-dimethylglutarate is obtained as a water-soluble, white amorphous solid.

EXAMPLE 10

*The Cyclohexylamine Salt of Hydrocortisone 21-Hemi-β,β-Dimethylglutarate*

By the procedure of Example 8 using 1.08 grams of hydrocortisone 21-hemi-β,β-dimethylglutarate, 214 milligrams of cyclohexylamine, and twenty milliliters of methylene chloride, the cyclohexylamine salt of hydrocortisone 21-hemi-β,β-dimethylglutarate is obtained as a water-soluble, white amorphous solid.

EXAMPLE 11

*The Dibenzylamine Salt of Hydrocortisone 21-Hemi-β,β-Dimethylglutarate*

By the procedure of Example 8 using 1.08 grams of hydrocortisone 21-hemi-β,β-dimethylglutarate, 286 milligrams of dibenzylamine, and ten milliliters of methylene chloride, the dibenzylamine salt of hydrocortisone 21-hemi-β,β-dimethylglutarate is obtained as a water-soluble, white amorphous solid.

EXAMPLE 12

*The Ephedrine Salt of Hydrocortisone 21-Hemi-β,β-Dimethylglutarate*

By substituting ephedrine hydrochloride for the procaine hydrochloride of Example 7 there is obtained the ephedrine salt of hydrocortisone 21-hemi-β,β-dimethylglutarate as a water-soluble, white, amorphous solid.

EXAMPLE 13

*The Epinephrine Salt of Hydrocortisone 21-Hemi-β,β-Dimethylglutarate*

By substituting the procaine hydrochloride of Example 7 by epinephrine hydrochloride, the epinephrine salt of hydrocortisone 21-hemi-β,β-dimethylglutarate is obtained as a water-soluble, white, amorphous solid.

EXAMPLE 14

*The Phenylephrine Salt of Hydrocortisone 21-Hemi-β,β-Dimethylglutarate*

By substituting phenylephrine hydrochloride for procaine hydrochloride in Example 7, the phenylephrine salt of hydrocortisone 21-hemi-β,β-dimethylglutarate is obtained.

EXAMPLE 15

*Monoethanolammonium Hydrocortisone 21-Hemi-β,β-Dimethylglutarate*

Following the procedure of Example 1 using monoethanolamine in place of N-methylglucamine, monoethanolammonium hydrocortisone 21-hemi-β,β-dimethylglutarate was obtained.

EXAMPLE 16

*Diethanolammonium Hydrocortisone 21-Hemi-β,β-Dimethylglutarate*

Following the procedure of Example 1 using diethanolamine in place of N-methylglucamine, diethanolammonium hydrocortisone 21-hemi-β,β-dimethylglutarate was obtained.

EXAMPLE 17

*Triethanolammonium Hydrocortisone 21-Hemi-β,β-Dimethylglutarate*

Following the procedure of Example 1 using triethanolamine in place of N-methylglucamine, triethanolammonium hydrocortisone 21-hemi-β,β-dimethylglutarate was obtained.

EXAMPLE 18

*N-Butylmonoethanolammonium Hydrocortisone 21-Hemi-β,β-Dimethylglutarate*

Following the procedure of Example 1 using N-butylmonoethanolamine in place of N-methylglucamine, N-butylmonoethanolammonium hydrocortisone 21 - hemi-β,β-dimethylglutarate was obtained.

EXAMPLE 19

*Ethyldiethanolammonium Hydrocortisone 21-Hemi-β,β-Dimethylglutarate*

Following the procedure of Example 1 using ethyldiethanolamine in place of N-methylglucamine, ethyldiethanolammonium hydrocortisone 21-hemi-β,β-dimethylglutarate was obtained.

EXAMPLE 20

*Phenylmonoethanolammonium Hydrocortisone 21-Hemi-β,β-Dimethylglutarate*

Following the procedure of Example 1 using phenylmonoethanolamine in place of N-methylglucamine, phenylmonoethanolammonium hydrocortisone 21-hemi-β,β-dimethylglutarate was obtained.

EXAMPLE 21

*p-Tertiaryamylphenyldiethanolammonium Hydrocortisone 21-Hemi-β,β-Dimethylglutarate*

Following the procedure of Example 1 using p-tertiaryamylphenyldiethanolamine in place of N-methylglucamine, p-tertiaryamylphenyldiethanolammonium hydrocortisone 21-hemi-β,β-dimethylglutarate was obtained.

EXAMPLE 22

*2-Amino-1-Butanol Salt of Hydrocortisone 21-Hemi-β,β-Dimethylglutarate*

Following the procedure of Example 1 using 2-amino-1-butanol in place of N-methylglucamine, 2-amino-1-butanol salt of hydrocortisone 21-hemi-β,β-dimethylglutarate was obtained.

EXAMPLE 23

*2-Amino-2-Ethyl-1,3-Propanediol Salt of Hydrocortisone 21-Hemi-β,β-Dimethylglutarate*

Following the procedure of Example 1 using 2-amino-2-ethyl-1,3-propanediol in place of N-methylglucamine, 2-amino-2-ethyl-1,3-propanediol salt of hydrocortisone 21-hemi-β,β-dimethylglutarate was obtained.

EXAMPLE 24

*2-Amino-2-Methyl-1-Propanol Salt of Hydrocortisone 21-Hemi-β,β-Dimethylglutarate*

Following the procedure of Example 1 using 2-amino-2-methyl-1-propanol in place of N-methylglucamine, 2-amino-2-methyl-1-propanol salt of hydrocortisone 21-hemi-β,β-dimethylglutarate was obtained.

EXAMPLE 25

*Tris(Hydroxymethyl)Aminomethane Salt of Hydrocortisone 21-Hemi-β,β-Dimethylglutarate*

Following the procedure of Example 1 using tris(hydroxymethyl)aminomethane in place of N - methylglucamine, tris(hydroxymethyl)aminomethane salt of hydrocortisone 21-hemi-β,β-dimethylglutarate was obtained.

By substituting the hydrocortisone 21-hemi-β,β-dimethylglutarate in Examples 5 through 25, by the other 21-β,β-dimethylglutarates and 21-β-methylglutarates of Examples 1 through 4, there are obtained the N-methylglucamine, galactamine, procaine, N,N'-dibenzylethylenediamine, bis-ortho-methoxyphenylisopropylamine, cyclohexylamine, dibenzylamine, ephedrine, epinephrine, phenylephrine, monoethanolamine, diethanolamine, triethanolamine, N-butylmonoethanolamine, ethyldiethanolamine, phenylmonoethanolamine, p-tertiaryamylphenyldiethanolamine, 2-amino-1-butanol, 2-amino-2-ethyl-1,3-propanediol, 2-amino-2-methyl-1-propanol and tris(hydroxymethyl)aminomethane salts of the 21-hemi-β,β-dimethylglutarates and 21-hemi-β-methylglutarates of cortisone, $\Delta^1$-cortisone, $\Delta^1$-hydrocortisone, -2-methylhydrocortisone, 9α-chloro-2-methylhydrocortisone and 9α-fluoro-2-methylhydrocortisone, and the 9α-fluoro- and 9α-chloro-cortisones, hydrocortisone, $\Delta^1$-cortisones, and $\Delta^1$-hydrocortisones.

EXAMPLE 26

*Intraveous Preparation*

A solution is prepared by dissolving 9.2 grams of sodium biphosphate U.S.P. XIV (monosodium orthophosphate), 38.0 grams of sodium phosphate exsiccated U.S.P. XIV (disodium orthophosphate), and 740 grams of sodium hydrocortisone 21-hemi-β,β-dimethylglutarate (Example 2) in 8.5 liters of water for injection U.S.P. XIV. The volume is then adjusted to ten liters by adding water for injection. The resulting solution is sterilized by filtration and the sterile filtrate is then filled into sterile five cc. bottles and lyophilized in the bottles. Each bottle is filled with two milliliters of the solution and after lyophilization contains a sterile powder containing 149 milligrams of sodium hydrocortisone 21-hemi-β,β-diethylglutarate (equivalent by weight to 100 milligrams of hydrocortisone).

Instead of using the sodium salt in Example 26, any of the above-mentioned amine salts can be used. In such cases, it is desirable but not necessary also to substitute the sodium phosphates by the corresponding amine phosphates. The alkaline earth metal salts such as calcium, strontium, and magnesium can be used. Also the unsubstituted ammonium salt and other alkali metal salts can be used.

Following the procedures given in the foregoing examples using the dicarboxylic inner anhydrides listed above, there are obtained the 21-hemi-α,β-dimethylsuccinates; the 21-hemi-α,β-diethylsuccinates; the 21-hemi-α,β-dichloro-α,β-dimethylsuccinates; the 21-hemi-α,β-dimethoxysuccinates; the 21-hemi-α,β-diethylglutarates; the 21-hemi-α,β-dimethylglutarates; the 21-hemi-α,γ-diisopropylglutarates; the 21-hemi-α-ethyl-β-methylglutarates; the 21 - hemi - β - ethyl - β - methylglutarates; the 21 - hemi-α,α,β - trimethylglutarates; the 21 - hemi α,β,β - trimethylglutarates; the 21 - hemi - α,β,γ - trimethylglutarates; the 21 - hemi - β - methyl - β - isopropylglutarates; the 21 - hemi - α - ethyl - β,β - dimethylglutarates; the 21-hemi - α,α,β,β - tetramethylglutarates; the 21 - hemi-α,β,β,γ - tetramethylglutarates; the 21 - hemi - β - methyl-β - butylglutarates; and the 21 - hemi - β - methyl - β-isobutylglutarates of cortisone, $\Delta^1$ - cortisone, $\Delta^1$ - hydrocortison, 9α - fluoro- and 9α - chlorohydrocortisone and 9α-fluoro- and 9α-chloro cortisone, 9α-fluoro- and 9α-chloro-$\Delta^1$-hydrocortisone and 9α-fluoro- and 9α-chloro-$\Delta^1$-cortisone or 2-methylhydrocortisone, and its 9α-chloro- and 9α-fluoro-derivatives.

Each of the above acid-esters can be converted to salts by neutralization with the inorganic and organic bases listed above.

The water-soluble compositions of this invention can be used advantageously for topical applications in the eye since they are not perceptible in the eye and are nonirritating. Solutions buffered with phosphate to a pH of 6.8 to 8.0 and made isotonic with sodium chloride are especially suitable for eye use. Preservatives can be added to these aqueous preparations, such as 0.01 percent "Merthiolate" (sodium ethylmercurithiosalicylate), 0.5 percent chlorobutanol and 0.5 percent benzyl alcohol. Similar formulations can be used as ear drops, nose drops, and as aerosols for the relief of respiratory difficulties.

For topical application on the skin or in the eye, especially stable and useful compositions can be prepared in the form of a bland nonirritating ointment. A preferred vehicle of this type is a mixture of white petrolatum 3 parts and liquid petrolatum 1 part. A portion of the white petrolatum can be replaced by wool fat to produce a more suitable vehicle which is then composed of about 55 percent white petrolatum, 25 percent white mineral oil and 20 percent wool fat. From such an ointment base the compositions of the invention are released gradually resulting in a more prolonged therapeutic action. In addition, such preparations are stable for long periods of time under normal temperature conditions.

Other types of formulations may also be very useful for external preparations such as dusting powders, oil-in-water emulsions, lotions, anhydrous water-soluble ointments (e.g. "Carbowaxes" or higher molecular weight polyethylene glycols), and the like. The type of formulation will depend on the ultimate use and conditions to which the composition will be subjected. Dusting powders may be formulated in the usual manner using finely powdered ingredients in a suitable inert base such as lactose.

Compositions of the invention may be formulated for administration to body cavities and may include such dosage forms as suppositories, bougies, vaginal creams and ointments, veterinary ointments for mastitis, dental cones, and the like. Here, the addition of one or more antibacterial agents (listed below) to the corticosteroids of the invention is especially useful where infections microorganisms are present or where an infection may be anticipated.

The particular antibacterial agents that may be used must be compatible with the corticosteroid, must be nontoxic and nonirritating in the area and in the manner in which they are to be used. The suppositories and bougies for human or animal use may be prepared by incorporating the corticosteroid composition of the invention in a suitable hard fat base such as cocoa butter or in a solid water-soluble compound such as the polyethylene glycols sold under the name of Carbowaxes. Alternatively, bougies may be prepared from mixtures of the water-soluble corticosteroid with inert water-soluble materials such as lactose and compressing the powder after suitable granulation technique on a tablet machine with specially shaped punches and dies to produce a bougie of the required size and shape.

Preparations for oral administration of the water-soluble corticosteroids of this invention may comprise tablets, lozenges, gelatine capsules, granules, aqueous solutions and dry mixes for dispersion in a suitable aqueous vehicle before use. Especially useful, is the aqueous solution to be taken by mouth and for this purpose is formulated with suitable sweetening, flavoring and coloring agents; for an elixir, alcohol would also be present. These solutions in contrast to the presently available corticosteroid suspensions, assure the patient uniform dosage.

Tablets of the new compositions may conveniently be prepared by moist granulation and compression or granulation by dry compression or "slugging" followed by final compression according to the usual methods of tablet preparation. A suitable buffering agent such as sodium phosphate or sodium citrate may be incorporated.

Effervescent tablets of the water-soluble compositions of this invention are especially suitable since clear solutions can be obtained without difficulty. The usual tartaric acid-citric acid-sodium bicarbonate base is used.

Co-pending application Serial Number 432,776, filed May 27, 1954, discloses the advantages of corticosteroids with ACTH. A particularly useful therapeutic preparation is obtained by combining the water-soluble corticosteroids of this invention with adrenocorticotrophic hormone in solution in sterile distilled water or saline for intravenous use or for injection intramuscularly or subcutaneously. Especially good results can be obtained from such a combination in a 16 percent aqueous solution of non-antigenic pharmaceutical gelatin upon injection intramuscularly or subcutaneously. In a further improvement, the 16 percent gelatin can be replaced by about 35 percent oxypolygelatin.

Other therapeutic materials can be incorporated in formulations containing water-soluble compositions of this invention to form new and very valuable compositions. Such therapeutic materials include antibacterial agents such as penicillins such as penicillin G, penicillin O, procaine penicillin, N,N'-dibenzylethylenediamine di-penicillin, and the like, bacitracin, tetracycline, chlortetracycline, oxytetracycline, chloramphenicol, streptomycin, dihydrostreptomycin, erythromycin, circulin, endomycin, tyrothricin, gramicidin, and the like, sorbic acid, nitrofurazone, chloroazodin, hexachlorophene, undecylenic acid, propionic acid, sodium and/or zinc caprylate, lower alkyl p-hydroxybenzoates, and the like, sulfonamides such as sodium sulfacetamide, sulfisoxazole diethanolamine, 4-aminomethylbenzenesulfonamide hydrochloride, sulfadiazine, sulfamerazine sulfamethazine, and the like, or mixtures of these antibacterial agents in combination with the selected water-soluble corticosteroid.

Similarly, therapeutic materials such as vitamins, and more particularly thiamine, riboflavin, pyridoxine, ascorbic acid, pantothenic acid, menadione, nicotinamide, folic acid, vitamin $B_{12}$, and the like, can be included in an oral or parenteral formulation containing a water-soluble corticosteroid of this invention to form new compositions exhibiting valuable therapeutic properties. Specially useful therapeutic results can be obtained with systematically administered antibiotics such as tetracycline, oxytetracycline, chlortetracycline, penicillin, erythromycin, streptomycin, dihydrosterptomycin, and the like when the antibiotic is combined with the vitamins mentioned above together with a water-soluble corticosteroid of the invention.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. Hydrocortisone 21-hemi-$\beta,\beta$-dimethyl glutarate.
2. Sodium hydrocortisone 21-$\beta,\beta$-dimethyl glutarate.
3. Sodium 2-methylhydrocortisone 21-$\beta,\beta$-dimethyl glutarate.

References Cited in the file of this patent

UNITED STATES PATENTS

| | | |
|---|---|---|
| 2,183,589 | Reichstein | Dec. 19, 1939 |
| 2,602,769 | Murray et al. | July 8, 1952 |
| 2,656,366 | Minlon | Oct. 20, 1953 |
| 2,708,651 | Laubach | May 17, 1955 |
| 2,751,402 | Schneider | June 19, 1956 |
| 2,783,226 | Gould et al. | Feb. 26, 1957 |
| 2,873,285 | Korman et al. | Feb. 10, 1959 |
| 8,875,200 | Hogg et al. | Feb. 24, 1959 |

FOREIGN PATENTS

| | | |
|---|---|---|
| 732,364 | Great Britain | June 22, 1955 |

OTHER REFERENCES

Fieser et al.: Natural Products Related to Phenanthrene, 3rd ed., pages 405–07 (1949).